United States Patent
Szeremeta et al.

(10) Patent No.: US 8,753,146 B1
(45) Date of Patent: Jun. 17, 2014

(54) UNIVERSAL TEST CONNECTOR FOR CONNECTING A SATA OR USB DATA STORAGE DEVICE TO A DATA STORAGE DEVICE TESTER

(75) Inventors: Wally Szeremeta, Mission Viejo, CA (US); Minh N. Trinh, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 168 days.

(21) Appl. No.: 13/527,460

(22) Filed: Jun. 19, 2012

(51) Int. Cl.
*H01R 13/60* (2006.01)

(52) U.S. Cl.
USPC .......................................... 439/540.1

(58) Field of Classification Search
CPC ...................................... H01R 43/24
USPC .................... 439/604, 544, 329, 78, 540.1
See application file for complete search history.

(56) References Cited

U.S. PATENT DOCUMENTS

| | | | |
|---|---|---|---|
| 7,503,802 B2 * | 3/2009 | Tu et al. ................. | 439/540.1 |
| 7,695,292 B2 * | 4/2010 | Lee ....................... | 439/110 |
| 7,857,638 B2 * | 12/2010 | Zhu ....................... | 439/78 |
| 8,250,266 B2 * | 8/2012 | Rugg et al. ............. | 710/72 |
| 8,279,603 B2 * | 10/2012 | Merrow et al. .......... | 361/695 |
| 8,419,477 B1 * | 4/2013 | Yu et al. ................. | 439/626 |
| 8,466,699 B2 * | 6/2013 | Merrow et al. .......... | 324/750.03 |
| 8,477,488 B2 * | 7/2013 | Aldridge ................ | 361/679.33 |
| 8,545,270 B2 * | 10/2013 | Yu et al. ................. | 439/626 |
| 8,547,123 B2 * | 10/2013 | Merrow et al. .......... | 324/750.06 |
| 2009/0286421 A1 | 11/2009 | Rugg et al. | |
| 2010/0015836 A1 * | 1/2010 | Zhu ....................... | 439/329 |
| 2010/0087094 A1 * | 4/2010 | Chen et al. ............. | 439/607.01 |
| 2010/0151727 A1 * | 6/2010 | Luo et al. ............... | 439/544 |

* cited by examiner

*Primary Examiner* — Neil Abrams
*Assistant Examiner* — Phuongchi T Nguyen

(57) ABSTRACT

A universal test connector is disclosed for connecting a data storage device including a plug connector, a USB interface connector, and a plurality of serial I/O (SIO) contacts to a data storage device tester. The universal test connector includes a receptacle connector configured to connect to the plug connector, a cross-member configured to conform around the USB interface connector, and a plurality of SIO contacts configured to connect to the plurality of SIO contacts on the data storage device.

28 Claims, 7 Drawing Sheets

UNIVERSAL TEST CONNECTOR FOR CONNECTING A SATA OR USB DATA STORAGE DEVICE TO A DATA STORAGE DEVICE TESTER

BACKGROUND

A huge market exists for data storage devices, such as data storage devices with Serial Advanced Technology Attachment (SATA) interfaces (such as SATA data storage devices) or Universal Serial Bus (USB) interfaces (such as USB data storage devices), for mass-market computing devices such as desktop computers and laptop computers. To be competitive, a SATA or USB data storage device should be relatively inexpensive and provide reliable performance.

To ensure reliability, USB and SATA data storage devices typically undergo a variety of testing during data storage device manufacturing. Such testing is typically carried out in a data storage device tester that includes multiple cells into which the data storage devices are loaded and unloaded such that a sequential series of tests and procedures can be administered to the loaded data storage devices. However, due to differences between USB and SATA interface connectivity, a data storage device tester for testing a USB data storage device requires a different type of connector than a tester for testing a SATA data storage device.

DETAILED DESCRIPTION

The present disclosure is directed to a universal test connector and data storage device tester (such as a disk drive tester) comprising one or more universal test connectors. The universal test connector is used for connecting a Serial Advanced Technology Attachment (SATA) data storage device (such as a SATA disk drive) including a SATA interface connector and a plurality of serial input/output (SIO) contacts or a Universal Serial Bus (USB) data storage device (such as a USB disk drive) including a USB interface connector, a plug connector, and a plurality of SIO contacts to the data storage device tester. In an embodiment, the universal test connector includes a receptacle connector, a cross-member, and a plurality of SIO contacts.

When the universal test connector is connected to a USB data storage device, the receptacle connector is connected to the plug connector on the USB data storage device, the cross-member conforms around the USB interface connector, and the SIO contacts on the test connector are connected to the SIO contacts on the USB data storage device. Alternatively, when the universal test connector is connected to a SATA data storage device, the receptacle connector is connected to the SATA interface connector and the SIO contacts on the test connector are connected to the SIO contacts on the SATA data storage device. In an embodiment, the universal test connector further includes blind mate plugs that are configured for blind mating into corresponding receptacles on the USB data storage device or the SATA data storage device.

Certain embodiments of the invention will now be described. These embodiments are presented by way of example only, and are not intended to limit the scope of the invention. Various omissions, substitutions and changes in the form of the universal test connector and data storage device tester described herein may be made without departing from the spirit of the invention. To illustrate some of the embodiments, reference will now be made to the figures.

Figure 1:
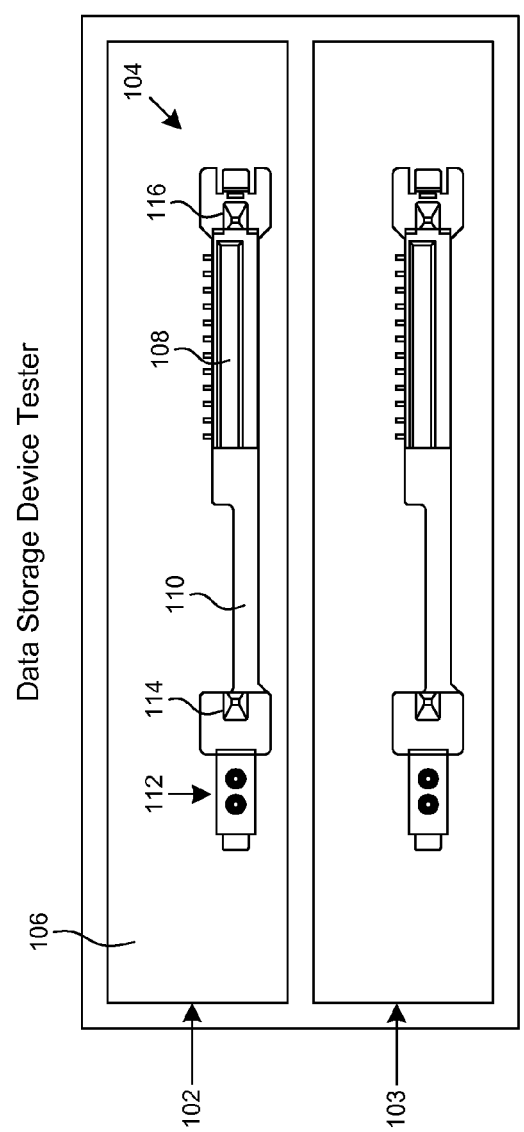
FIG. 1 shows a front view of a data storage device tester including a universal test connector in each of a plurality of cells according to an embodiment of the present invention wherein each test connector is configured to connect to a USB or SATA data storage device.

FIG. 1 shows a data storage device tester 100 according to an embodiment of the present invention comprising a plurality of cells 102, 103, wherein each cell comprises a universal test connector 104 and a backplane printed circuit board (PCB) 106. The data storage device tester 100 provides tests and procedures for data storage devices comprising a SATA interface and connector (SATA data storage device) or a USB interface and connector (USB data storage device) as required in a data storage device manufacturing process. The data storage devices include, for example, disk drives (such as USB 2.0, USB 3.0, or SATA disk drives), solid state devices (SSD) (each comprising non-volatile semiconductor memory (NVSM) (such as flash memory)), and hybrid devices (each comprising a disk drive and NVSM (such as flash memory)). The tests and procedures provided by the data storage device tester 100 may include, for example, media scanning, defect discovery, read channel optimization, and standard back-end test processing as known in the art.

It is noted that the data storage device tester 100 shown in FIG. 1 has only two cells for the sake of simplicity in illustrating the invention; however, as can be appreciated by one of ordinary skill in the art, the data storage device tester may include a large number of cells as required in an efficient high volume data storage device manufacturing process (such as a high volume disk drive manufacturing process).

As shown in FIG. 1, each universal test connector 104 comprises a receptacle connector 108, a cross-member 110, and a plurality of SIO contacts 112 and is configured to connect to a USB (e.g., USB 2.0 or USB 3.0) data storage device (such as a USB 2.0 or USB 3.0 disk drive) or a SATA data storage device (such as a SATA disk drive). In one embodiment, each of the SIO contacts comprises a spring-loaded contact, wherein the spring-loaded contact is depressed by a corresponding contact on a USB or SATA data storage device when the test connector 104 is connected to the data storage device. In the embodiment shown in FIG. 1, the universal test connector 104 comprises two SIO contacts 112. In one embodiment, the universal test connector comprises more than two SIO contacts.

In the embodiment shown in FIG. 1, the universal test connector further comprises blind mate plugs 114, 116 for blind mating into a SATA or USB data storage device. When the test connector is connected to a SATA or USB data storage device, the blind mate plugs on the test connector are inserted into corresponding receptacles on the SATA or USB data storage device. The receptacle connector 108 further comprises a portion of a standard SATA 15-pin power receptacle. In an embodiment, the receptacle connector 108 comprises a 12-pin portion of the standard SATA power receptacle. In the embodiment shown in FIG. 1, the SIO contacts 112, the cross-member 110, the blind mate plugs 114, 116, and the receptacle connector 108 are in alignment.

When the test connector 104 is connected to a USB data storage device (such as a USB 2.0 or 3.0 data storage device) comprising a USB interface connector, a plug connector, and a plurality of SIO contacts, the receptacle connector 108 is connected to the plug connector, the cross-member 110 conforms around the USB interface connector, and the SIO contacts 112 on the test connector are connected to the SIO contacts on the USB data storage device. The receptacle connector 108 comprises a plurality of contacts (not shown in FIG. 1) for providing power to the USB data storage device via corresponding contacts on plug connector. The SIO contacts 112 on the test connector 104 provide serial communication between the data storage device tester 100 and the USB data storage device via the SIO contacts on the USB data storage device. In one embodiment, the receptacle connector 108 further comprises SIO contacts for providing serial communication between the tester 100 and the USB data storage device via corresponding SIO contacts on the plug connector. In an embodiment, the SIO contacts on the receptacle connector 108 are connected to the SIO contacts on the test connector 104 via traces on the backplane PCB 106.

When the test connector 104 is connected to a SATA data storage device comprising a SATA interface connector and a plurality of SIO contacts, the receptacle connector 108 is connected to the SATA interface connector and the SIO contacts 112 on the test connector 104 are connected to the corresponding SIO contacts on the SATA data storage device. The plurality of power contacts (not shown in FIG. 1) on the receptacle connector 108 provide power to the SATA data storage device via corresponding power contacts on SATA interface connector. The SIO contacts 112 on the test connector 104 provide serial communication between the data storage device tester 100 and the SATA data storage device via the SIO contacts on the SATA data storage device.

Figure 2:
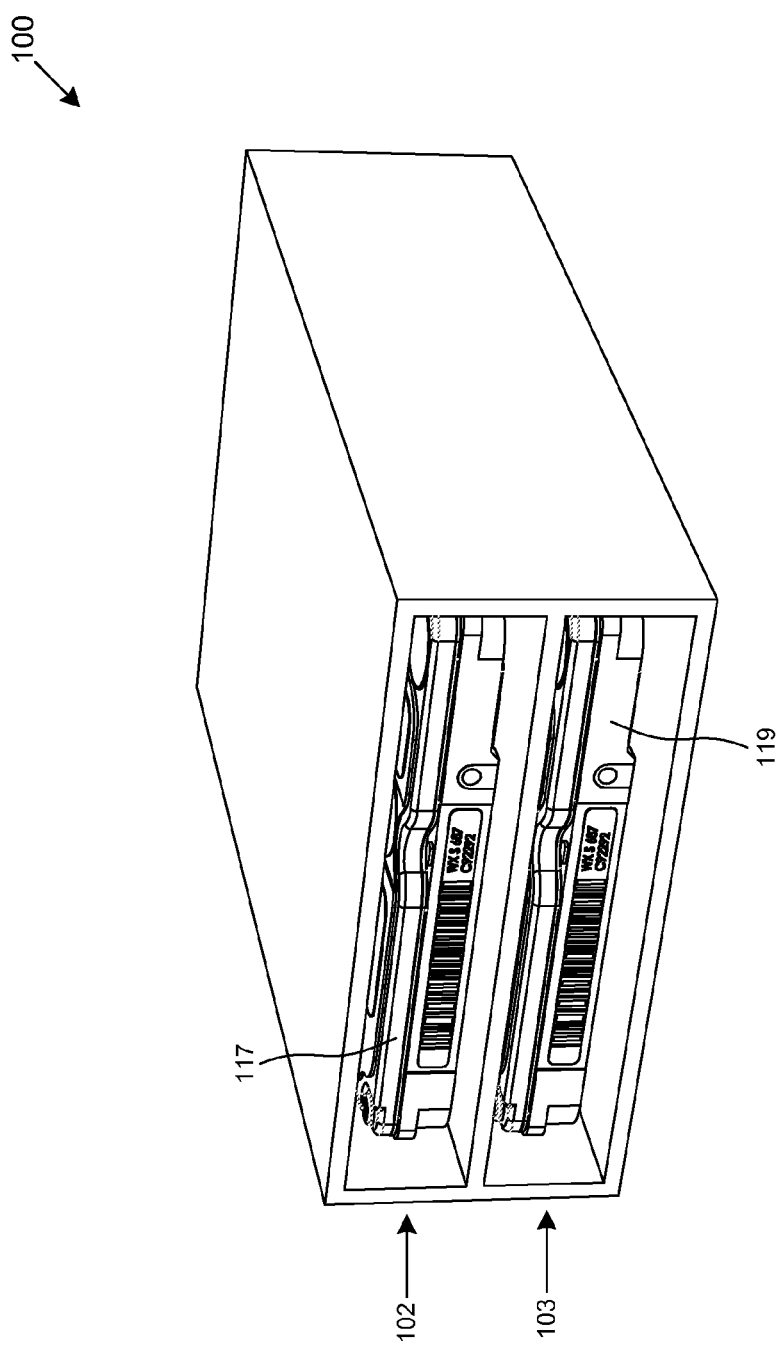
FIG. 2 shows a perspective view of the data storage device tester in FIG. 1 connected to a plurality of data storage devices wherein the data storage devices are USB or SATA data storage devices.

FIG. 2 shows a perspective view of data storage device tester 100 in FIG. 1 with a plurality of data storage devices loaded therein according to an embodiment of the present invention. As shown in FIG. 2, respective data storage devices 117, 119 are loaded into respective cells 102, 103, wherein each data storage device is connected to the data storage device tester 100 via a universal test connector 104 (shown in FIG. 1) in each cell. The data storage devices 117, 119 may comprise, for example, SATA data storage devices or USB data storage devices (such as USB 2.0 or 3.0 data storage devices).

Figure 3A:
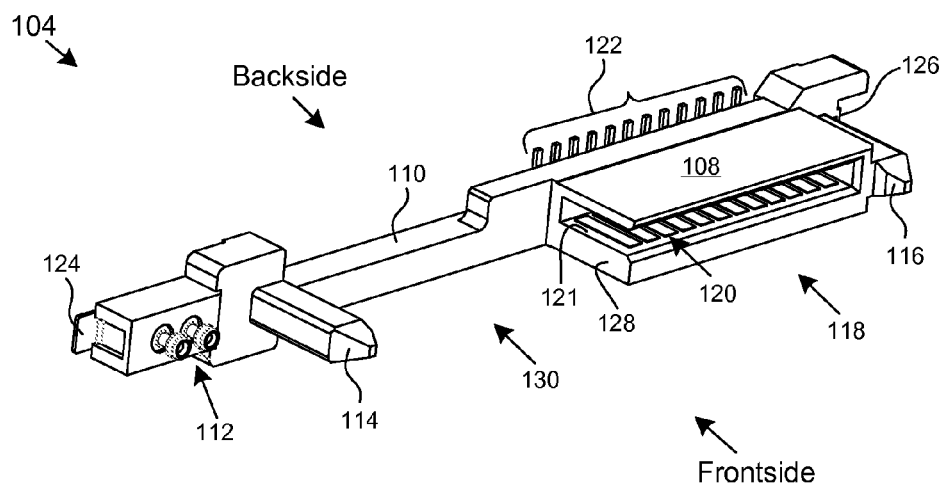
FIG. 3A shows a perspective view of a universal test connector according to an embodiment of the present invention wherein the universal test connector is configured to connect to a USB or SATA data storage device.

FIG. 3A shows a perspective view of a universal test connector 104 comprising a receptacle connector 108, a cross-member 110, a plurality of SIO contacts 112, and blind mate plugs 114, 116 according to an embodiment of the present invention. As shown in FIG. 3A, one blind mate plug 114 is situated between the cross-member 110 and the SIO contacts 112 and the receptacle connector 108 is situated between the other blind mate plug 116 and the cross-member 110. Thus, in the embodiment shown in FIG. 3A, the cross-member 110 and the receptacle connector 108 are situated between the blind mate plugs 114, 116.

As shown in FIG. 3A, the receptacle connector 108 comprises an opening 118 on the frontside of the test connector 104 for receiving a plug connector on a USB data storage device. In the embodiment shown in FIG. 3A, the opening 118 in the receptacle connector 108 is in alignment with the cross-member 110 and the blind mate plugs 114, 116. The receptacle connector 108 further comprises a plurality of contacts 120 for supplying power to a SATA or USB data storage device, wherein the contacts 120 are situated on a lower inside surface 121 of the receptacle connector 108 and are accessible through the opening 118 in the receptacle connector 108.

As shown in FIG. 3A, the universal test connector 104 further comprises a plurality of contacts 122 situated on the backside of the test connector 104 and underlying the receptacle connector 108, wherein the backside contacts 122 are connected, respectively, to the contacts 120 situated on the lower inner surface 121 of the receptacle connector 108. The backside contacts 122 are configured for connection to the backplane PCB 106 in each cell 102, 103 of the data storage device tester 100 (shown in FIG. 1). For example, the backside contacts 122 may be connected to the backplane PCB 106 (shown in FIG. 1) by soldering the contacts 122 to traces on the backplane PCB 106.

In an embodiment of the invention shown in FIG. 3A, the test connector 104 further comprises a tabs 124, 126 (shown clearly in FIG. 3B) for securing the test connector 104 to the backplane PCB 106 in each cell of the data storage device tester 100. The tabs 124, 126 are situated at opposing ends of the test connector 104 and may be secured to the backplane PCB 106 by using, for example, solder, epoxy, or other adhesive material. In one embodiment, the tabs 124, 126 are not used.

As shown in FIG. 3A, an edge 128 of the receptacle connector 108, the cross-member 110, and the blind mate plug 114 adjacent to the SIO contacts 112 define a substantially U-shaped space 130 on the test connector 104 for receiving a USB interface connector on a USB data storage device (such as a USB 2.0 or 3.0 data storage device). When the test connector 104 is connected to a SATA data storage device, a power portion of the SATA interface connector on the SATA data storage device extends into the substantially U-shaped space 130.

Figure 3B:
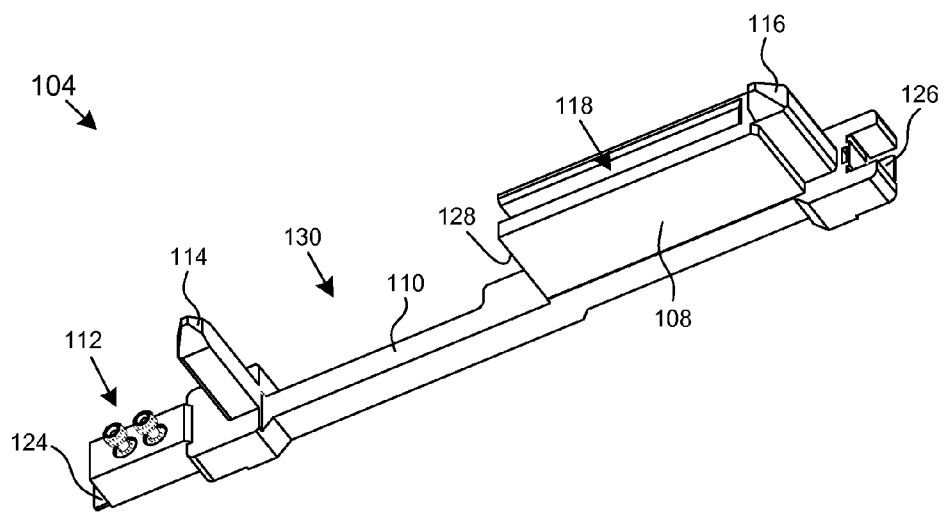
FIG. 3B shows another perspective view of the universal test connector in FIG. 3A.

FIG. 3B shows another perspective view of the universal test connector 104 according to an embodiment of the present invention.

Figure 4A:
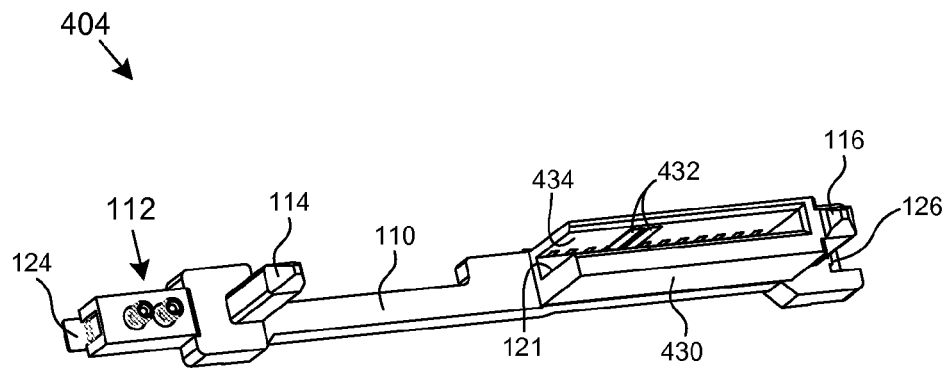
FIG. 4A shows a perspective view of a universal test connector according to an embodiment of the present invention wherein the universal test connector is configured to connect to a USB or SATA data storage device.

FIG. 4A shows a perspective view of a universal test connector according to an embodiment of the present invention. In FIG. 4A, the universal test connector 404 comprises a receptacle connector 430, a cross-member 110, a plurality of SIO contacts 112, blind mate plugs 114, 116, and tabs 124, 126. In the embodiment in FIG. 4A, the receptacle connector 430 comprises a plurality of SIO contacts 432 situated on an upper inner surface 434 of the receptacle connector 430, in addition to a plurality of contacts 120 (shown in FIG. 3A) situated on an opposing lower inner surface 121 of the receptacle connector 430.

In the embodiment shown in FIG. 4A, the SIO contacts 432 on the upper inner surface 434 of the receptacle connector 430 provide serial communication between a data storage device tester 100 (shown in FIGS. 1, 2) and a USB data storage device (such as a USB 2.0 or 3.0 data storage device) via corresponding SIO contacts on a plug connector in the USB data storage device. In an embodiment, the SIO contacts 432 on the upper inner surface 434 of the receptacle connector 430 provide serial communication between the data storage device tester 100 (shown in FIGS. 1, 2) and a SATA data storage device via corresponding SIO contacts on the SATA interface connector in the SATA data storage device. In an embodiment, the SIO contacts 432 in the receptacle connector 430 are connected to the SIO contacts 112 on the test connector 404 via traces on the backplane PCB 106 (shown in FIG. 1).

Figure 4B:
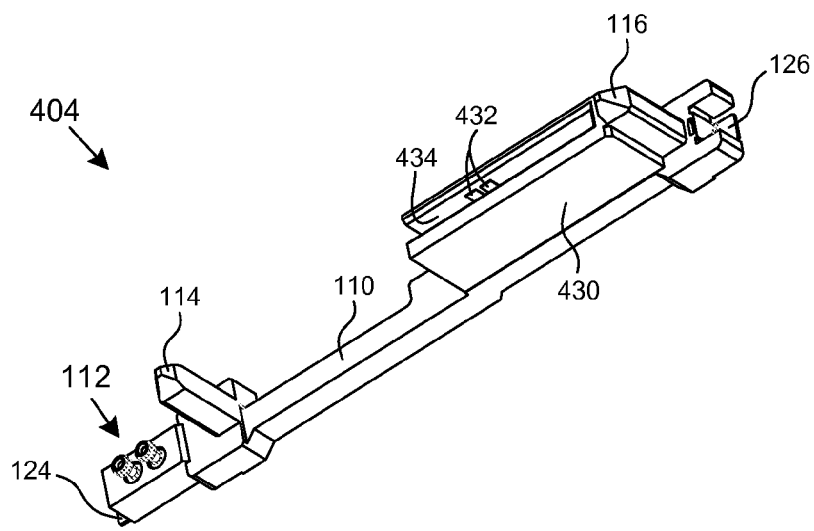
FIG. 4B shows another perspective view of the universal test connector in FIG. 4A

FIG. 4B shows another perspective view of the universal test connector 404 according to an embodiment of the present invention.

Figure 5:
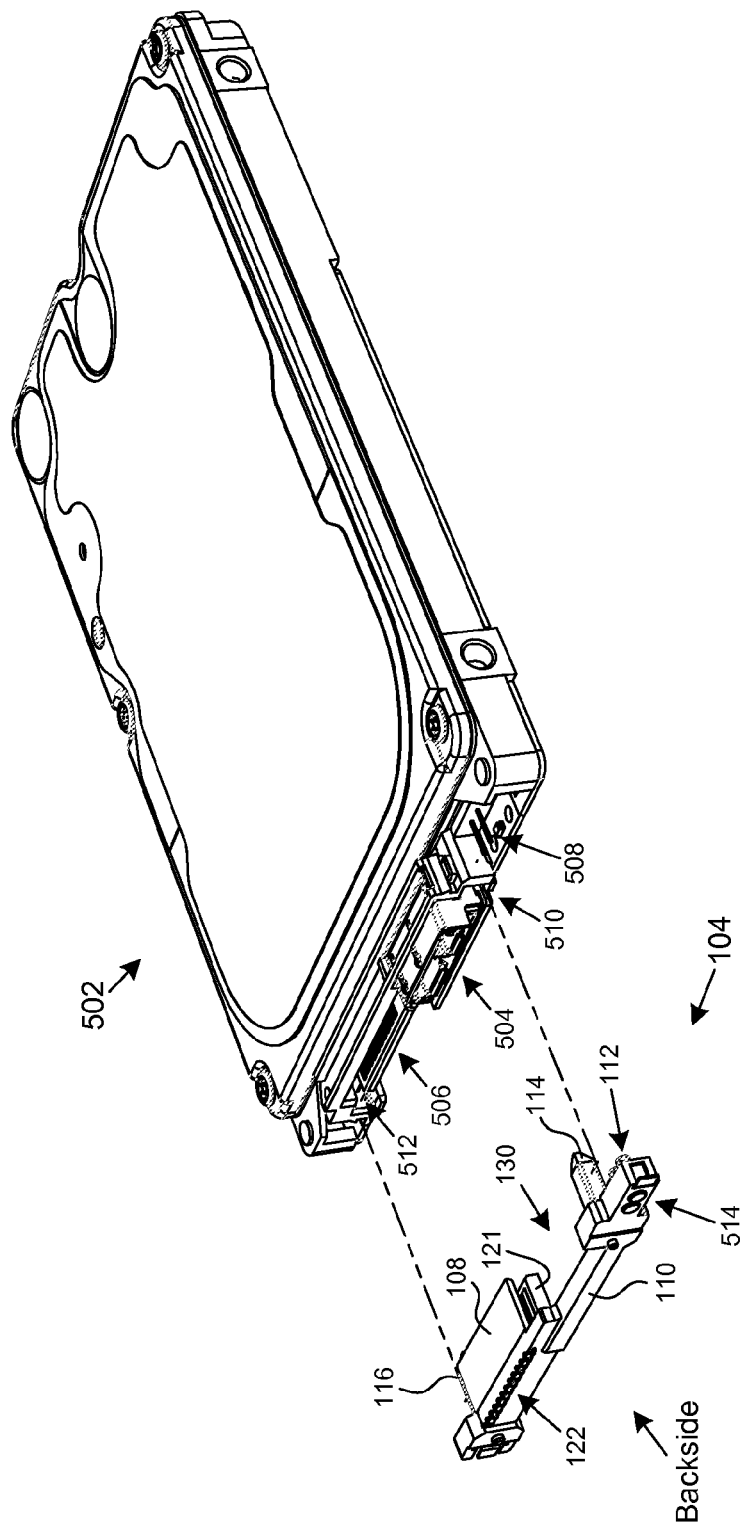
FIG. 5 shows perspective views of a universal test connector and a USB 3.0 data storage device according to an embodiment of the present invention.

FIG. 5 shows a perspective view of a universal test connector and a USB 3.0 data storage device according to an embodiment of the present invention. In the embodiment shown in FIG. 5, the USB 3.0 data storage device 502 comprises a USB 3.0 interface connector 504, a plug connector 506, a plurality of SIO contacts 508, and blind mate receptacles 510 and 512. When the test connector 104 is connected to the USB 3.0 data storage device 502, the receptacle connector 108 is connected to the plug connector 506, the substantially U-shaped space 130 (defined by edge 121 of the receptacle connector 108, cross-member 110, and blind mate plug 114) receives the USB 3.0 interface connector 510, the cross-member 110 conforms around the USB 3.0 interface connector 510, and the SIO contacts 112 on the test connector are connected to the SIO contacts 508 on the USB 3.0 data storage device. Also, when the test connector 104 is connected to the USB 3.0 data storage device 502, the blind mate plugs 114, 112 on the test connector are inserted into the corresponding blind mate receptacles 510, 512 on the USB 3.0 data storage device 502, thereby enabling the USB 3.0 data storage device to blind mate into the test connector.

As shown in FIG. 5, the test connector 104 comprises a plurality of SIO contacts 514 situated on the backside of the test connector 104, wherein the backside SIO contacts are connected, respectively, to the SIO contacts 112 situated on the frontside of the test connector 104. The backside SIO contacts 514 are connected to the backplane PCB 106 in the data storage device tester 100 (shown in FIG. 1), thereby providing a connection between the frontside SIO contacts 112 and the data storage device tester.

In the embodiment shown in FIG. 5, when the USB 3.0 data storage device 502 is connected to the data storage device tester 100 (shown in FIGS. 1, 2), power is provided from the data storage device tester 100 to the USB 3.0 data storage device 502 via the receptacle connector 108 and the plug connector 506, and SIO communication is provided between the data storage device tester 100 and the USB 3.0 data storage device via the SIO contacts 112 on the test connector 104 and the SIO contacts 508 on the USB 3.0 data storage device. In an embodiment in which the test connector 404 (shown in FIGS. 4A, 4B) comprises a receptacle connector 430 (shown in FIGS. 4A, 4B) comprising SIO contacts 432, SIO communication is provided between the data storage device tester 100 and the USB 3.0 data storage device 502 via the SIO contacts 432 (shown in FIG. 4A) on the receptacle connector 430 and corresponding SIO contacts on the plug connector 506 on the USB 3.0 data storage device.

Figure 6:
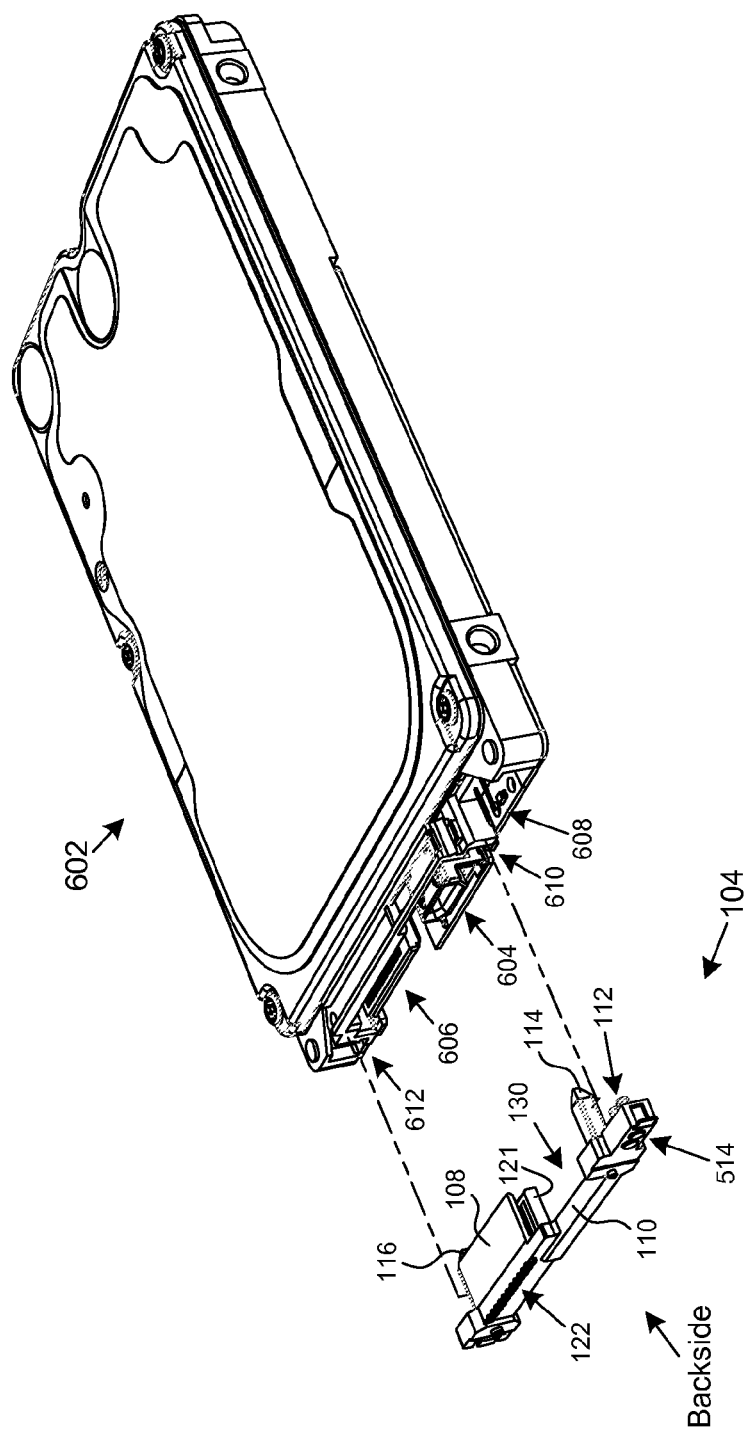
FIG. 6 shows perspective views of a universal test connector and a USB 2.0 data storage device according to an embodiment of the present invention.

FIG. 6 shows a perspective view of a universal test connector and a USB 2.0 data storage device according to an embodiment of the present invention. In the embodiment shown in FIG. 6, the USB 2.0 data storage device 602 comprises a USB 2.0 interface connector 604, a plug connector 606, a plurality of SIO contacts 608, and blind mate receptacles 610, 612. When the test connector 104 is connected to the USB 2.0 data storage device 602, the receptacle connector 108 on the test connector is connected to the plug connector 606, the substantially U-shaped space 130 (defined by edge 121 of the receptacle connector 108, cross-member 110, and blind mate plug 114) receives the USB 2.0 interface connector 610, the cross-member 110 conforms around the USB 2.0 interface connector 610, and SIO contacts 112 on the test connector are connected to corresponding SIO contacts 608 on the USB 2.0 data storage device. Also, when the test connector 104 is connected to the USB 2.0 data storage device 602, the blind mate plugs 114, 112 on the test connector are inserted into the corresponding blind mate receptacles 610, 612 on the USB 3.0 data storage device 602, thereby enabling the USB 2.0 data storage device to blind mate into the test connector 104.

In the embodiment shown in FIG. 6, when the USB 2.0 data storage device 602 is connected to the data storage device tester 100 (shown in FIGS. 1, 2), power is provided from the data storage device tester 100 to the USB 2.0 data storage device 602 via the receptacle connector 108 and the plug connector 606, and SIO communication is provided between the data storage device tester 100 and the USB 2.0 data storage device via SIO contacts 112 on the test connector 104 and corresponding SIO contacts 608 on the USB 2.0 data storage device. In an embodiment in which the test connector 404 (shown in FIGS. 4A, 4B) comprises a receptacle connector 430 (shown in FIGS. 4A, 4B) comprising SIO contacts 432, SIO communication is provided between the data storage device tester 100 and the USB 2.0 data storage device 602 via the SIO contacts 432 and corresponding SIO contacts on the plug connector 606 on the USB 2.0 data storage device.

Figure 7:
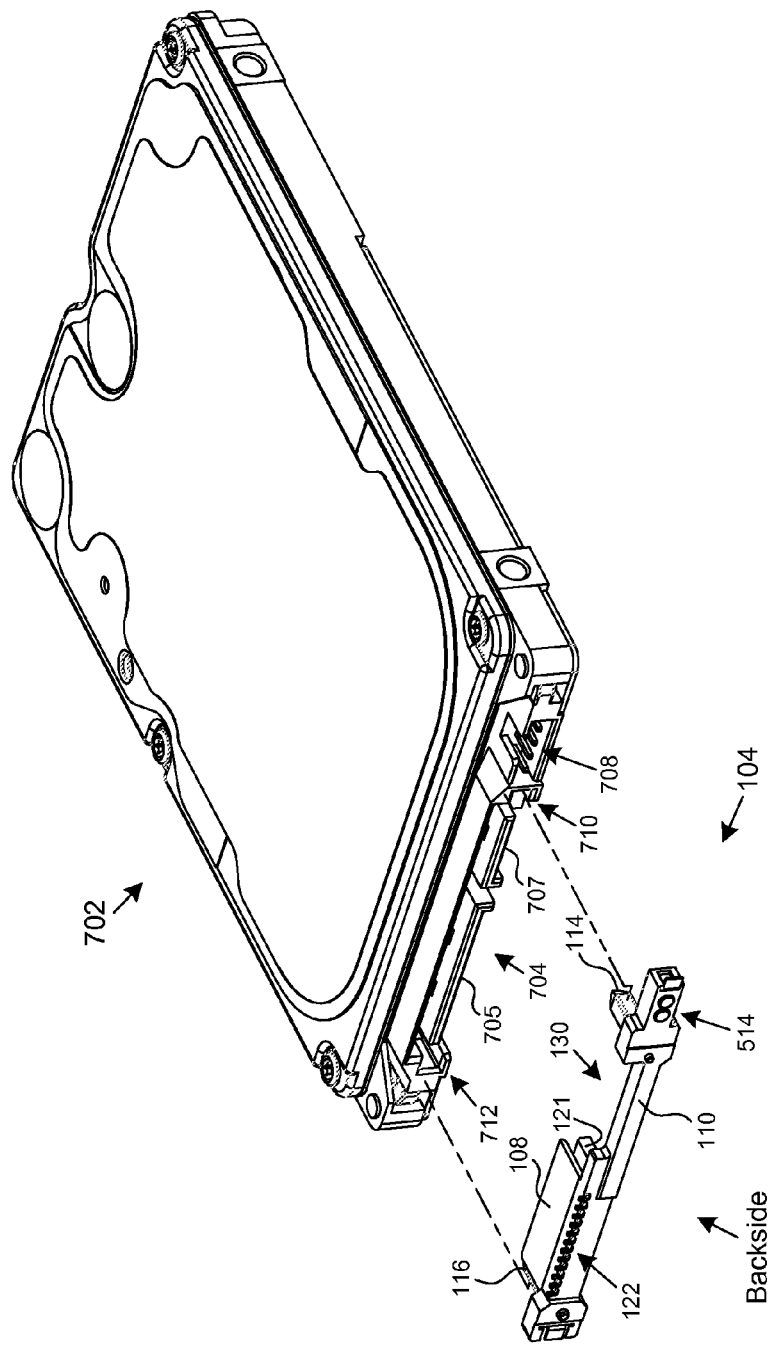
FIG. 7 shows perspective views of a universal test connector and a SATA data storage device according to an embodiment of the present invention.

FIG. 7 shows a perspective view of a universal test connector and a SATA data storage device according to an embodiment of the present invention. In the embodiment shown in FIG. 7, the SATA data storage device 702 comprises a SATA interface connector 704 comprising a power portion 705 and an I/O signal portion, a plurality of SIO contacts 708, and blind mate receptacles 710, 712. When the test connector 104 is connected to the SATA data storage device 702, the receptacle connector 108 is connected to the power portion 705 of the SATA interface connector 704 and the power portion 705 extends into the substantially U-shaped space 130 (defined by edge 121 of the receptacle connector 108, cross-member 110, and blind mate plug 114), and SIO contacts 112 on the test connector are connected to corresponding SIO contacts 708 on the SATA data storage device. Also, when the test connector 104 is connected to the SATA data storage device 702, the blind mate plugs 114, 112 on the test connector are inserted into the corresponding blind mate receptacles 710, 712 on the SATA data storage device 702, thereby enabling the SATA data storage device to blind mate into the test connector 104.

In the embodiment shown in FIG. 7, when the SATA data storage device 702 is connected to the data storage device tester 100 (shown in FIGS. 1, 2), power is provided from the data storage device tester 100 to the SATA data storage device 702 via the receptacle connector 108 and the power portion 705 of the SATA interface connector 704, and SIO communication is provided between the data storage device tester 100 and the SATA data storage device via SIO contacts 112 on the test connector 104 and corresponding SIO contacts 708 on the SATA data storage device. In an embodiment in which the test connector 404 (shown in FIGS. 4A, 4B) comprises a receptacle connector 430 (shown in FIGS. 4A, 4B) comprising SIO contacts 432, SIO communication is provided between the data storage device tester 100 and the SATA data storage device 702 via the SIO contacts 432 in the test connector 404 and corresponding SIO contacts on the power portion 705 of the SATA interface connector 704 on the SATA data storage device.

The features and attributes of the specific embodiments disclosed above may be combined in different ways to form additional embodiments, all of which fall within the scope of the present disclosure. Although certain embodiments have been disclosed, other embodiments that are apparent to those of ordinary skill in the art, including embodiments which do not provide all of the features and advantages set forth herein, are also within the scope of this disclosure. Accordingly, the scope of protection is defined only by the claims.

What is claimed is:

1. A universal test connector for connecting a USB data storage device comprising a plug connector, a USB interface connector, and a plurality of serial I/O (SIO) contacts to a data storage device tester, the universal test connector comprising:
    a first test connector comprising a receptacle connector, a cross-member, and a plurality of serial I/O (SIO) contacts, the first test connector configured to connect to a SATA data storage device comprising a SATA interface connector, or the USB data storage device;
    wherein the receptacle connector is configured to connect to the plug connector, the cross-member is configured to conform around the USB interface connector, and the plurality of SIO contacts is configured to connect to the plurality of SIO contacts on the data storage device.

2. The universal test connector as recited in claim 1, wherein the receptacle connector comprises a portion of a serial ATA (SATA) power receptacle connector.

3. The universal test connector as recited in claim 1, wherein each of the plurality of SIO contacts on the test connector is a spring-loaded contact.

4. The universal test connector as recited in claim 1, wherein the USB interface connector is a USB 3.0 interface connector.

5. The universal test connector as recited in claim 1, wherein the receptacle connector comprises a first plurality of contacts for providing power to the data storage device.

6. The universal test connector as recited in claim 5, wherein the receptacle connector further comprises a second plurality of contacts for providing serial communication between the data storage device tester and the data storage device via the plug connector.

7. The universal test connector as recited in claim 6, wherein each of the second plurality of contacts is connected to one of the SIO contacts on the test connector.

8. The universal test connector as recited in claim 1, further comprising first and second blind mate plugs configured for blind mating into the data storage device.

9. The universal test connector as recited in claim 8, wherein the receptacle connector and the cross-member are situated between the first blind mate plug and the second blind mate plug.

10. The universal test connector as recited in claim 8, wherein the receptacle connector comprises an opening for receiving the plug connector, wherein the opening is in alignment with the cross-member and the first and second blind mate plugs.

11. The universal test connector as recited in claim 8, wherein a side of the receptacle connector, the cross-member, and the first blind mate plug define a substantially U-shaped space on the test connector for receiving the USB interface connector.

12. The universal test connector as recited in claim 11, wherein the first blind mate plug is situated between the cross-member and the SIO contacts on the test connector.

13. A data storage device tester for testing serial ATA (SATA) and USB data storage devices, the data storage device tester comprising:
    a first test connector comprising a receptacle connector, a cross-member, and a plurality of serial I/O (SIO) contacts, the first test connector configured to connect to a SATA data storage device comprising a SATA interface connector and a plurality of SIO contacts, or a USB data storage device comprising a plug connector, a USB interface connector, and a plurality of SIO contacts;
    wherein, when the first test connector is connected to the USB data storage device, the receptacle connector is configured to connect to the plug connector, the cross-member is configured to conform around the USB interface connector, and the plurality of SIO contacts on the test connector are configured to connect to the plurality of SIO contacts on the USB data storage device.

14. The data storage device tester as recited in claim 13, wherein the receptacle connector comprises a portion of a SATA power receptacle connector.

15. The data storage device tester as recited in claim 13, wherein each of the plurality of SIO contacts on the first test connector is a spring-loaded contact.

16. The data storage device tester as recited in claim 13, wherein the USB data storage device is a USB 3.0 data storage device.

17. The data storage device tester as recited in claim 13, wherein the receptacle connector comprises a first plurality of contacts for providing power from the data storage device tester to the USB data storage device via the plug connector.

18. The data storage device tester as recited in claim 17, wherein the receptacle connector further comprises a second plurality of contacts for providing serial communication between the data storage device tester and the USB data storage device via the plug connector.

19. The data storage device tester as recited in claim 18, wherein each of the second plurality of contacts is connected to one of the SIO contacts on the first test connector.

20. The data storage device tester as recited in claim 13, wherein the first test connector further comprises first and second blind mate plugs configured for blind mating into the USB data storage device.

21. The data storage device tester as recited in claim 20, wherein the receptacle connector and the cross-member are situated between the first blind mate plug and the second blind mate plug.

22. The data storage device tester as recited in claim 20, wherein the receptacle connector comprises an opening for receiving the plug connector, wherein the opening is in alignment with the cross-member and the first and second blind mate plugs.

23. The data storage device tester as recited in claim 20, wherein a side of the receptacle connector, the cross-member, and the first blind mate plug define a substantially U-shaped space on the first test connector for receiving the USB interface connector.

24. The data storage device tester as recited in claim 23, wherein the first blind mate plug is situated between the cross-member and the SIO contacts on the first test connector.

25. The data storage device tester as recited in claim 13, wherein, when the first test connector is connected to the SATA data storage device, the receptacle connector is configured to connect to the SATA interface connector and the plurality of SIO contacts on the first test connector are configured to connect to the plurality of SIO contacts on the SATA data storage device.

26. The data storage device tester as recited in claim 25, wherein the first test connector further comprises first and second blind mate plugs configured for blind mating into the SATA data storage device.

27. The data storage device tester as recited in claim 26, wherein a side of the receptacle connector, the cross-member, and the first blind mate plug define a substantially U-shaped space on the first test connector, wherein a power portion of the SATA interface connector extends into the substantially U-shaped space.

28. The data storage device tester as recited in claim 25, wherein the receptacle connector comprises a plurality of contacts for providing power from the data storage device tester to the SATA data storage device via the SATA interface connector.

* * * * *